United States Patent [19]

Mahrus et al.

[11] 4,267,241
[45] May 12, 1981

[54] METHOD OF PREPARING STEEL-BACKED ANTIFRICTION ALLOY, COMPOSITE STRIPS AND PRODUCTS THEREFROM

[75] Inventors: Duraid Mahrus; Antonio C. Paulos, both of Sao Paulo, Brazil

[73] Assignee: Metal Leve S.A. Industria e Comercio, Brazil

[21] Appl. No.: 74,801

[22] Filed: Sep. 11, 1979

[30] Foreign Application Priority Data

Sep. 15, 1978 [BR] Brazil .............................. 7806091

[51] Int. Cl.³ .............................................. C23C 1/06
[52] U.S. Cl. ........................................ 428/645; 148/1; 219/121 EB; 427/38; 427/43.1
[58] Field of Search ............. 148/1, 4; 428/643, 644, 428/645, 594; 219/121 EB; 427/38

[56] References Cited

U.S. PATENT DOCUMENTS

| | | | |
|---|---|---|---|
| 3,505,126 | 4/1970 | Antes | 148/1 |
| 3,852,560 | 12/1974 | Streel | 219/121 EB |
| 4,071,643 | 1/1978 | Pratt et al. | 428/643 |
| 4,153,477 | 5/1979 | Beyer et al. | 148/1 |

Primary Examiner—M. J. Andrews
Attorney, Agent, or Firm—Steinberg & Raskin

[57] ABSTRACT

A method of improving steel-backed antifriction alloy; composite strips and products therefrom, wherein the antifriction alloys previously deposited on the steel backing strip are subjected throughout the strip length to a spot-by-spot fusion operation performed by a highly-concentrated energy beam (electron or other), the intensity and displacement rate of said beam being adjusted in respect of the composite strip in such a manner as to afford a spot-by-spot fusion of the anti-friction alloys to a depth equal to the antifriction layer thickness; and a method wherein concentration of said energy beam is adjusted so as to enable the mass surrounding any given melting spot to cause an abrupt cooling of said spot when the energy beam is moved to an adjoining spot.

8 Claims, 3 Drawing Figures

FIG. 1
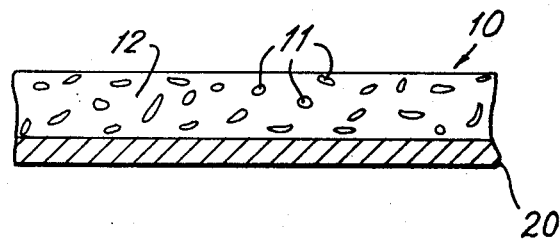
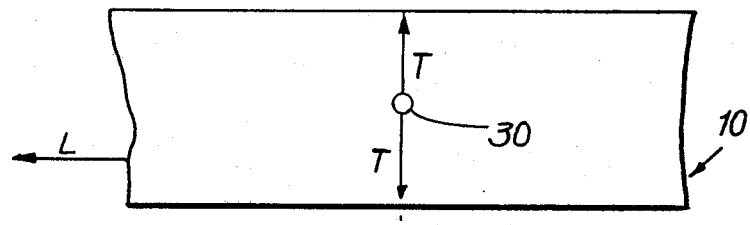
FIG. 2
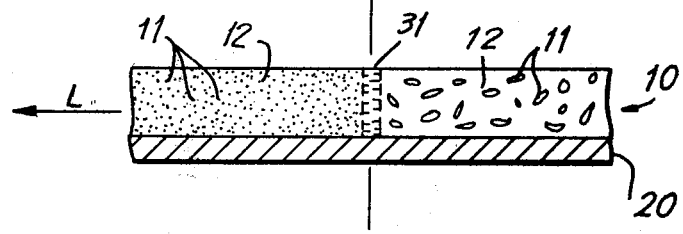
FIG. 3

METHOD OF PREPARING STEEL-BACKED ANTIFRICTION ALLOY, COMPOSITE STRIPS AND PRODUCTS THEREFROM

This invention relates to a method of improving antifriction alloys previously produced and deposited on steel strips by conventional methods such as casting, sintering or roll bonding, said method being designed to increase the mechanical strength properties of said alloys. Such steel strips having a layer of antifriction material are widely employed in the manufacture of plain bearings for internal combustion engines and machines provided with bearings.

According to the conventional method, a steel strip is subjected to a suitable dimensional and surface treatment prior to the bonding of an antifriction layer thereto. If one elects the sintering process as the method for lining the steel strip with an antifriction material, a layer of the antifriction alloy powder is deposited on the strip, whereafter the assembly is sintered under suitable conditions to achieve the bonding of the powder particles to the steel back surface.

By the casting method, a molten layer of the antifriction alloy is poured onto the steel strip. Where a roll bonding is desired, the antifriction alloy is bonded to the steel back by rolling pressure.

The strips lined by any such methods are subsequently subjected to heat or mechanical treatment designed to enhance certain physical properties of the antifriction alloy layer. The strips thus obtained are then subjected to cutting, blanking, machining and surface treatment to form plain bearings, bushings and thrust washers.

The antifriction alloy layers are typical as a result of the method and chemical composition of the alloy employed. As a rule, these alloys always have a structure composed of at least two phases, wherein the prevailing phase, in the form of a matrix, has a higher melting point, therefore constituting the hardest phase of the alloy. Upon solidification, the hardest phase traps within its interstices the softer phases (lower melting point) in dendritic or spherical shape thereby forming "islands" which function as a kind of solid lubricant on bearings.

The usually irregular size and shape of such islands is a basic function of the alloy chemical composition and homogeneity and of the cooling rate in the different methods of deposition of the layer on the backing strip and treatment of the assembly.

The formation of islands having a large size or a steady tendency in these structures is undesirable for it brings about adverse results to mechanical properties of the material. The desired antifriction and mechanical strength properties depend on a good diffusion or distribution of the soft phases through the hardest phase matrix.

In view of the chemical composition of the antifriction alloys, the cooling rate plays a very important role for obtaining alloys having a suitable and homogeneous structure, as the faster the cooling, the finer the diffusion or distribution of the soft phases within the harder phase matrix.

However, the achievement of the cooling of the alloy at a rate required to ensure a suitable structure by conventional methods of deposition and treatment is complex and costly.

It is one object of the invention to provide a method of improving antifriction alloys bonded to steel backing strips in such a manner as to allow a change to the structure of said alloys, by providing a finer diffusion of the soft phases within the matrix of the harder phase.

A further object of the invention is to provide strips composed of a steel backing and an antifriction alloy layer, the latter providing in its structure a substantially finer diffusion of the soft phases within the harder phase as compared to diffusions achieved heretofore.

Another object of the invention is to make possible the obtaining of products made from strips composed of a steel backing and an antifriction alloy layer, the latter providing in its structure a substantially finer diffusion of the soft phases in the harder phase as compared to diffusions achieved heretofore.

The method of the invention is hereinafter described with reference to the accompanying drawing where:

FIG. 1 represents a cross-sectional elevation of a strip composed of a steel backing and an antifriction alloy layer prior to improvement of the latter.

FIG. 2 represents a schematic plan view of the composite strip during the improvement of its antifriction layer.

FIG. 3 represents a cross-sectional elevation of the composite strip during the improvement of its antifriction layer.

As shown in FIG. 1, after deposition of the antifriction alloy 10 on steel backing 20 by conventional methods, antifriction layer 10 of the composite strip has a structure wherein the softer phase 11 is diffused in the form of islands in the core of the harder phase 12.

According to the process of the invention, the surface of the composite strip covered with an antifriction alloy is subjected to a highly concentrated energy beam 30 (e.g., an electron beam) capable of sweeping a surface exposed to same, thereby melting the surface spot-by-spot within areas defined by the concentration of beam 30. Beam 30 is adjusted to melt alloy 10 only to the depth required to reach the antifriction alloy-steel interface without allowing the effects of the beam to affect on the steel strip.

The spot-by-spot or successive localized area melting takes place within very short periods of them due to the high concentration of the energy beam. Melting is to be performed in a chamber under protective atmosphere so as to prevent oxidation of the material undergoing processing.

In one exemplary means of performing the process, the composite strip is moved lengthwise at a given speed toward arrow L shown on FIGS. 2 and 3, while energy beam 30 is moved now in one direction, now in the opposite, (arrows T of FIG. 2) crosswise the composite strip, at a rate affording a linear fusion transverse to the composite strip axis.

A complete solubility or miscibility between the alloy constituents by fusion at points of incidence 31 of the beam is attained by means of a suitable control of the energy beam intensity and its dwelling time at one point of the strip.

When the beam leaves one spot and moves to the next one, an abrupt cooling takes place owing to the dissipation of heat of the melted spot onto the surrounding mass (antifriction alloy and backing strip) which has not been reached by the beam. As this self-cooling takes place in an abrupt manner, it promotes the prompt solidification of the phase having a higher melting point, thereby trapping within its crystal "net" the phase or phases having a lower melting point. This will prevent agglomeration of the phase having a lower melting point into islands, thereby providing a highly improved and homogeneously distributed soft phase.

Rapid solidification on the hardest phase may be further enhanced by additional external cooling means such as gas or water blasts applied to the coated strip adjacent to the molten areas.

It is possible therefore to obtain a continuous improvement of the antifriction layer by adjusting strip and beam speeds.

What is claimed is:

1. A method for preparing an anti-friction bearing material composite comprising a steel backing-strip supporting at the interface therewith, on at least one side of said strip, an anti-friction alloy coating, said alloy of said coating consisting essentially of a higher-melting, hard-metal matrix phase having homogenously distributed therethrough a lower melting soft-metal inclusion phase, which comprises coating said steel strip with a metal mixture comprising said hard metal admixed with said soft metal, locally fusing said coated mixture from its outer surface to its interface with said steel backing strip by local impingement of a concentrated high-energy beam on said coating to form a uniform molten pool area of said higher melting and lower melting alloy at the area of impingement of said beam, and abruptly cooling and solidifying said molten pool by moving said beam-impinging area from said fused area to an adjacent locale and by conducting the fusion energy from said fused area by conduction into cooler portions of said coated strip to form in said cooled area a homogeneous solid dispersion of said soft-metal inclusion phase in said hard-metal matrix phase, and fusing and cooling successive areas of said coating by traversing locales of said coated strip until the entire area of said coated strip has been successively fused and solidified to provide the bearing material composite comprising the alloycoated steel strip wherein said alloy consists of substantially said soft-metal inclusion phase homogenously dispersed in said hard-metal matrix phase.

2. The method as defined in claim 1 wherein the fusion of the coated alloys is performed under an oxide-protective atmosphere.

3. The method as defined in claim 1, wherein solidification of fused areas is accelerated by means of an additional cooling provided by gas or water blasts.

4. The anti-friction bearing material composite prepared according to the method of claim 1.

5. The method as defined in claim 1 wherein said high energy beam is an electron beam.

6. The method as defined in claim 5, wherein displacement of the electron beam is obtained by moving the coated strip lengthwise simultaneously with a crosswise reciprocating motion of the beam.

7. The method as defined in claim 5, wherein the structure of the alloy coating is provided with a fine diffusion of the softer phase or phases by means of successive local area fusions carried out by an electron beam throughout the length and thickness of said anti-friction alloy.

8. The method for preparing anti-friction bearings and washers from steel-backed anti-friction bearing material composites which comprises coating of said steel strip with a metal mixture comprising a higher melting hard-metal admixed with a lower melting soft-metal, subjecting said coating on said steel strip to successive area-by area fusion through its thickness to its interface with the strip by a highly concentrated energy beam until the entire area of said strip has been fused, cooling each area of fusion to solidification by the abrupt removal of said energy beam and the conduction of the heat of fusion from said area to form an anti-friction alloy coating on said strip, said alloy consisting essentially of said soft-metal homogenously dispersed as an inclusion phase in a hard-metal matrix, and fashioning bearings and washers from said anti-friction alloy-coated steel strip.

* * * * *